April 24, 1928.

J. H. KINTZELE 1,667,321

VEGETABLE SLICING MACHINE

Original Filed Jan. 15, 1926  7 Sheets-Sheet 1

Inventor
J. H. KINTZELE

By
Attorney

April 24, 1928.

J. H. KINTZELE

VEGETABLE SLICING MACHINE

Original Filed Jan. 15, 1926

Inventor
J. H. KINTZELE

By
Attorney

April 24, 1928.  J. H. KINTZELE  1,667,321
VEGETABLE SLICING MACHINE
Original Filed Jan. 15. 1925   7 Sheets-Sheet 5

Inventor
J. H. KINTZELE

By
Attorney

April 24, 1928.

J. H. KINTZELE 1,667,321

VEGETABLE SLICING MACHINE

Original Filed Jan. 15, 1926    7 Sheets-Sheet 6

Inventor
J. H. KINTZELE

By

Attorney

April 24, 1928. 1,667,321
J. H. KINTZELE
VEGETABLE SLICING MACHINE
Original Filed Jan. 15, 1926    7 Sheets-Sheet 7
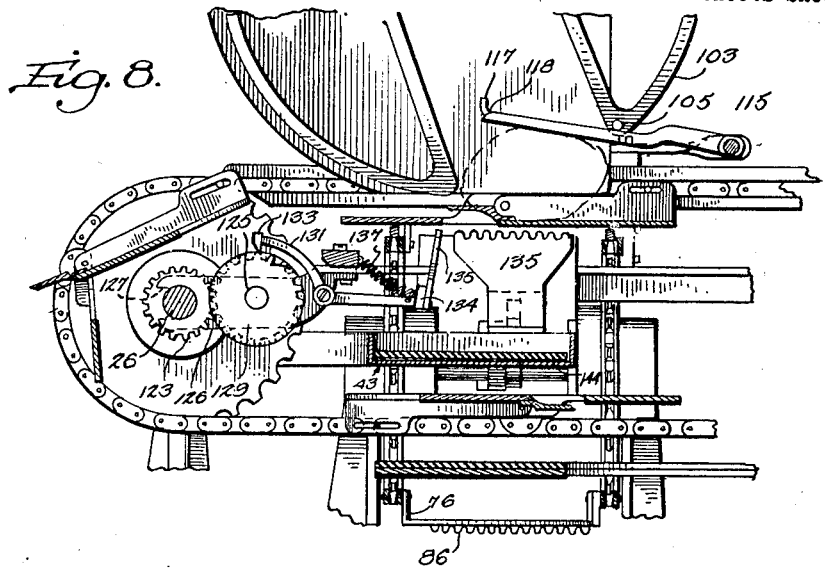
Fig. 8.
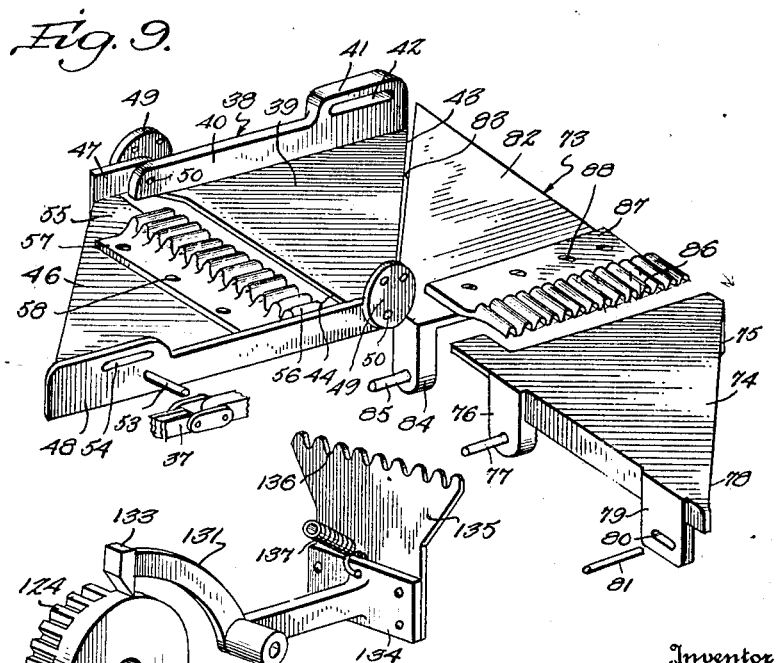
Fig. 9.
Fig. 10.
Inventor
J. H. KINTZELE
By
Ch. Parker
Attorney Patented Apr. 24, 1928.

1,667,321

UNITED STATES PATENT OFFICE.

JULIUS H. KINTZELE, OF ST. LOUIS, MISSOURI, ASSIGNOR TO POTATO WAFFLES, INC., OF NEW YORK, N. Y., A CORPORATION OF DELAWARE.

VEGETABLE-SLICING MACHINE.

Application filed January 15, 1926, Serial No. 81,502. Renewed August 10, 1927.

This invention relates to a vegetable slicing machine and more particularly to a machine adapted for cutting potato chips in a particular form.

An important object of the invention is to provide a machine of the above mentioned character which is adapted to continuously cut successive slices from a potato in a novel manner.

A further object is to provide a machine of the above mentioned character wherein cutting knives are provided at spaced intervals along endless chains whereby they are adapted successively to be brought into engagement with the potato to cut the slices therefrom.

A still further object is to provide a pair of endless chain drive mechanisms arranged at right angles to each other and provided at spaced intervals with cutting means, the cutting means of each of said mechanisms being adapted to be successively and alternately brought into engagement with the potato to cut slices therefrom, each of the cutting means and elements associated therewith being so formed that they provide a substantially continuous support for the potato or other vegetable during the operation of the machine.

A still further object is to provide a machine of the above mentioned character wherein the cutting elements referred to are corrugated whereby the alternate slicing of the potato by knives or cutters moving at right angles to each other is adapted to produce chips or slices having corrugated opposite faces, the corrugations of the faces of the chip or slice running at right angles to each other.

A still further object is to provide a machine of the character just mentioned wherein the knives or cutting members of the two mechanisms lie substantially in the same plane whereby the corrugations on one side of the chip intersect those of the opposite side to produce a perforated or lattice work effect on the successive chips.

A still further object is to provide novel means for feeding the potatoes to the cutting means to maintain positive contact therewith.

A still further object is to provide means for releasing the chips from the cutting members after each cutting operation has been completed.

A still further object is to provide means for carrying the chips or slices from the machine as they are successively cut.

A still further object is to provide novel drive means for the endless chain mechanisms, the potato feeding means and the means for carrying off the slices.

Other objects and advantages of the invention will become apparent during the course of the following description.

In the drawings I have shown one embodiment of the invention. In this showing:

Figure 8 is a fragmentary sectional view on line 8—8 of Figure 3,

Figure 9 is a detail perspective of two of the cutting members and associated elements, a portion of one of the drive chains and associated pins being shown detached, and, Figure 10 is a similar view of the chip releasing means.

Figure 5:
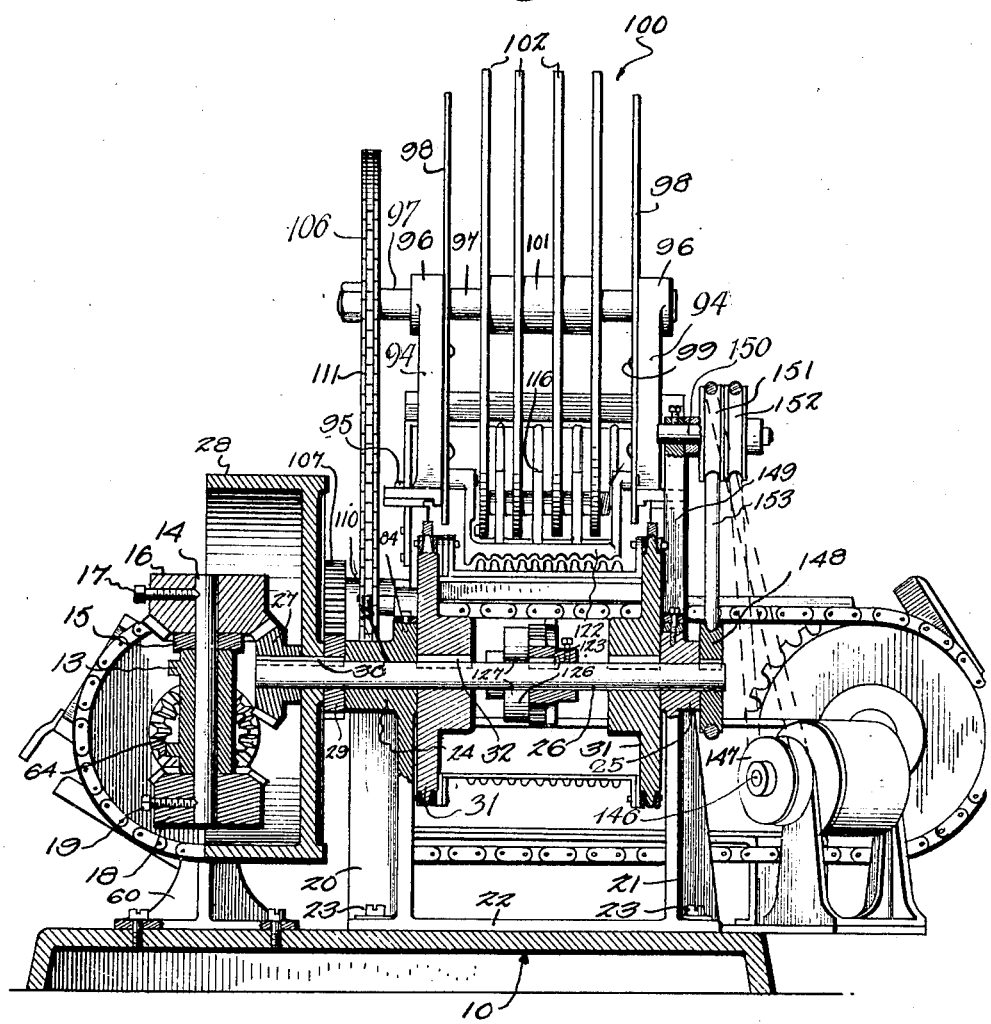
Figure 5 is a section substantially on line 5—5 of Figure 3.

Referring to the drawings, the numeral 10 designates a preferably integral base adapted to support the elements of the machine. A bearing bracket 11 is secured to the base as at 12 and is provided adjacent its upper end with an offset substantially vertical bearing 13 in which is rotatably supported a shaft 14. A bearing collar 15 surrounds the shaft 14, as shown in Figure 5, and contacts with the upper end of the bearing 13. A bevel gear 16 is secured to the shaft 14 by a set screw 17 or other suitable means. A similar bevel gear 18 is secured to the shaft 14 by a set screw 19 or similar means. It will be apparent that the gear 18 is arranged adjacent the lower end of the bearing 13 and the gear 16 will be supported upon the collar 15.

A pair of standards 20 and 21 is arranged above the base near one side thereof, as shown in Figure 5. These standards are connected at their lower ends by a base portion 22, and are secured to the base 10 by bolts 23. The standards are provided adjacent their upper ends with bearings 24 and 25 in which is rotatably mounted a shaft 26. The shaft extends a substantial distance beyond the bearing 24 and is provided with a bevel gear 27 meshing with the gear 16. A pulley 28 surrounds the shaft 26, adjacent the gear 27, and a pinion 29 surrounds the shaft 26 between the pulley 28 and bearing 24. The gears 27 and 29, and the pulley 28 are secured to the shaft 26 preferably by a single key 30. It will be apparent that a belt may be passed about the pulley 28 and connected to a suitable source of power, such as an electric motor, for driving the shaft 26. Rotation of the shaft 26 obviously will rotate the shaft 14 through the gears 16 and 27.

A pair of spaced sprocket wheels 31 are arranged inwardly of the standards 20 and 21, as shown in Figure 5, and these sprockets are keyed to the shaft 26, as shown at 32. At the opposite side of the machine, a pair of supports 33 are arranged, and these supports are provided at their upper ends with bearings 34 rotatably supporting a shaft 35. Sprocket wheels 36, similar to the sprocket wheels 31, are secured to the shaft 35 inwardly of the bearings 34. Endless chains 37 pass around each of the sprockets 31 and its corresponding sprocket 36, as will be apparent.

Means for cutting the potatoes are carried by the chains 37 at spaced intervals therealong.

Figure 3:
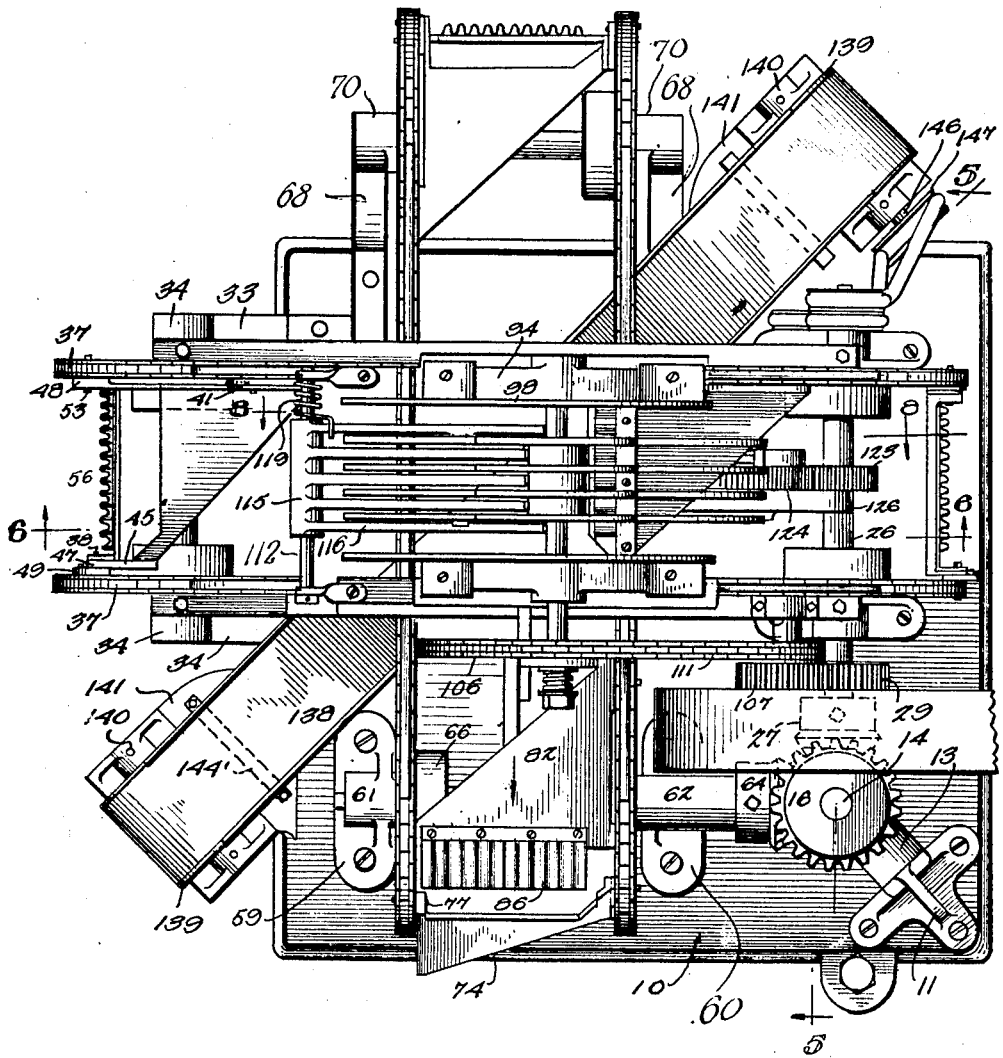
Figure 3 is a plan view.
Figure 4:
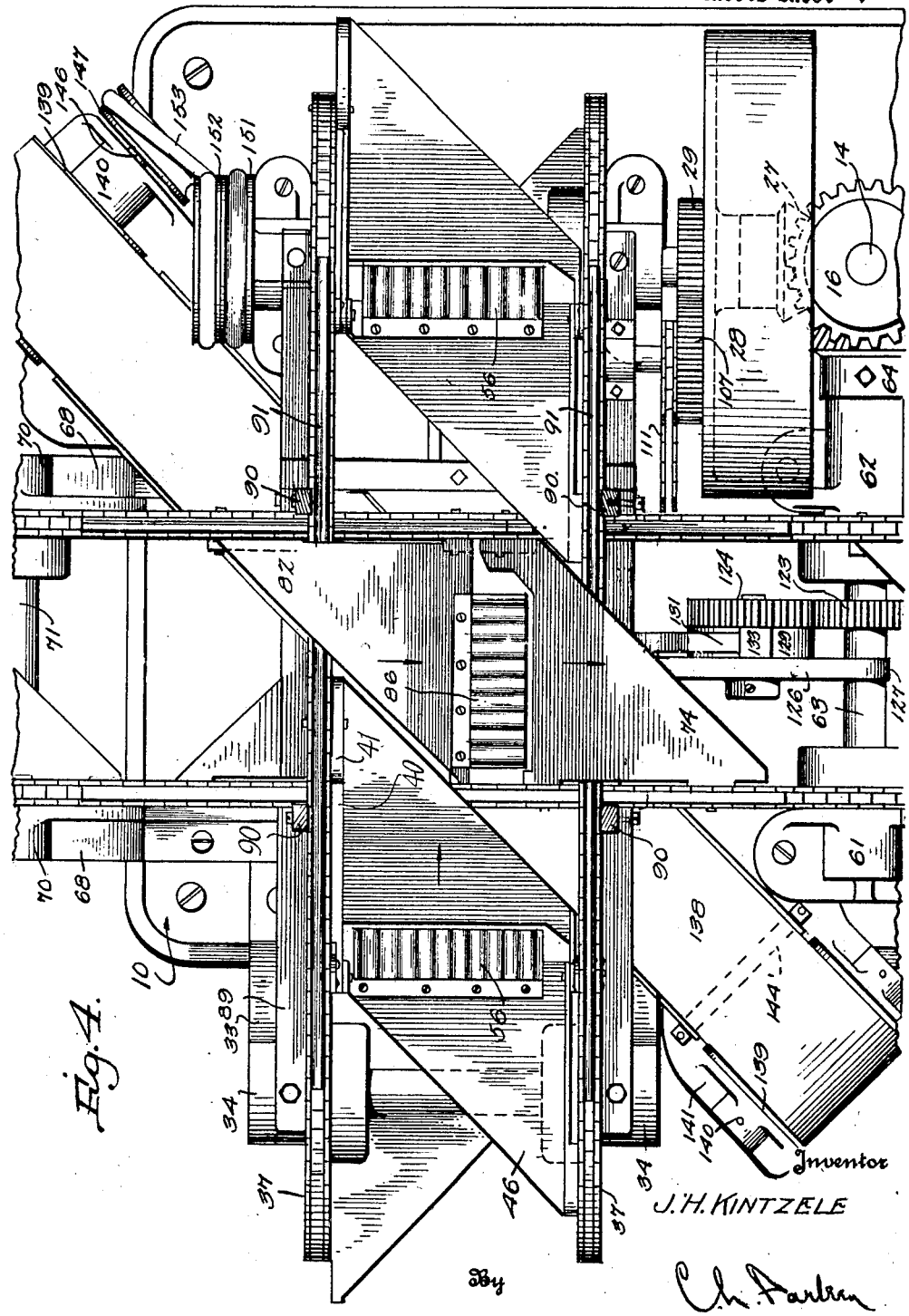
Figure 4 is an enlarged plan view, parts being removed.
Figure 6:
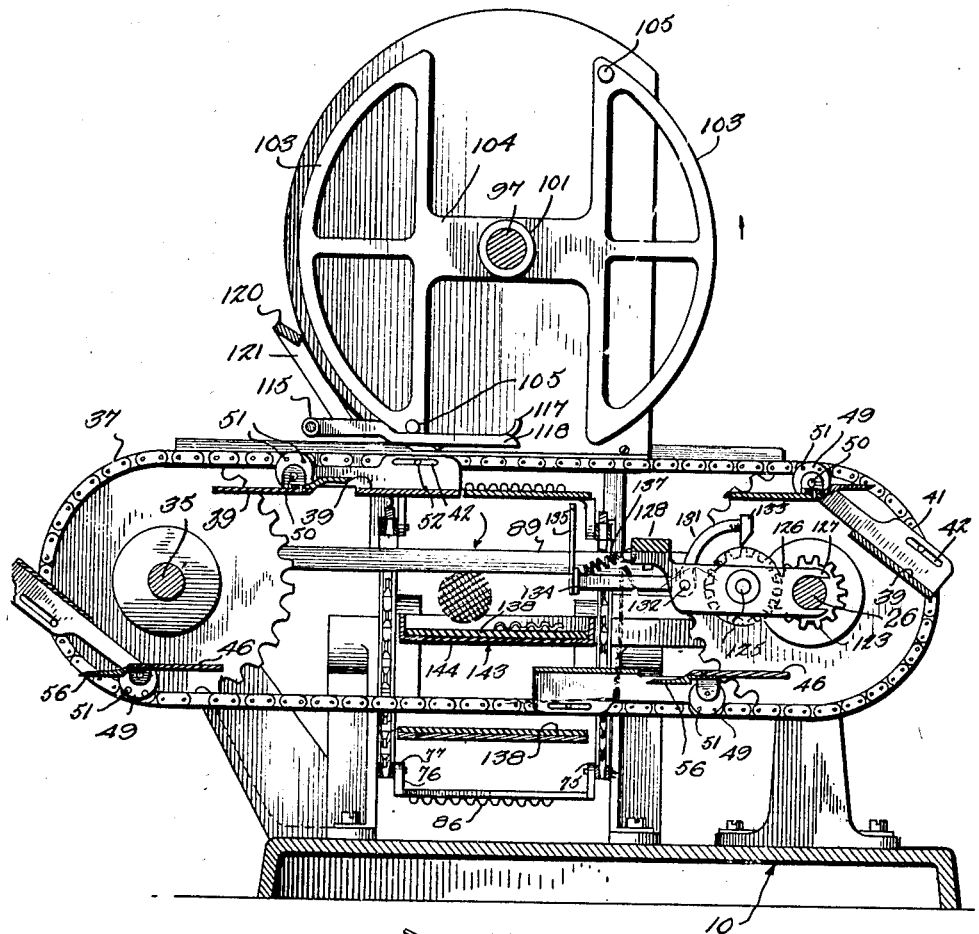
Figure 6 is a similar view on line 6—6 of Figure 3.
Figure 7:
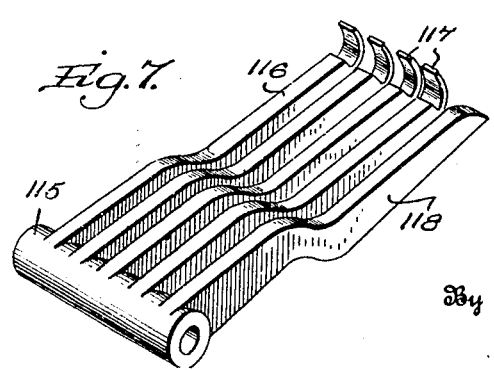
Figure 7 is a detail perspective of a portion of the feed mechanism.

One of the cutting members and its associated elements is indicated by the numeral 38 in Figure 9 of the drawings. As shown, a plate 39 is provided adjacent one edge with a flange 40 having a lug 41 formed integral therewith and provided with a slot 42. The forward edge 43 of the plate 39 extends substantially at an angle of forty-five degrees with respect to the edge of the plate 39 as defined by the flange 40. The flange 40 is arranged parallel to the chains 37, as shown in Figure 4. The rear edge 44 of the plate 39 is arranged at right angles to the flange 40. Opposite the flange 40 the plate 39 is provided with a relatively short flange 45, as shown in Figure 3, for a purpose to be described. A supporting and knife carrying plate 46 is arranged rearwardly of the plate 39 and is provided at opposite edges with flanges 47 and 48. The adjacent ends of the flanges 40 and 47, and the adjacent ends of the flanges 45 and 48 overlap each other and disks 49 are arranged outwardly of these overlapping ends. Pivot pins 50 pass through the disks 49 and through the overlapping ends of the adjacent flanges whereby the plates 39 and 46 are pivotally connected. The disks 49 are secured to the chains 37 by pins 51, as shown in Figure 6. It will be apparent therefore, that the plates are adapted to be driven by the chains. A pin 52 is secured to the chain adjacent each of the plates 39 and is adapted to pass through the slot 42, as shown in Figure 6. It will be apparent that the arrangement of the pin 52 in the slot 42 is adapted to support the free end of each of the plates 39. Similarly, a pin 53 is secured to one of the chains 37 opposite the pin 52, and is adapted to enter a slot 54 formed in the flange 48 whereby the free end of the plate 46 also will be properly supported. The forward edge 55 of each plate 46 is arranged parallel to the edge 44 of the adjacent plate 39 and is spaced therefrom. A cutting member or knife 56 is arranged between each pair of plates, as shown in detail in Figure 9. The cutting edge of each of the knives is corrugated, as shown, and each knife is provided rearwardly thereof with a straight flange 57 secured to the adjacent plate 46 by rivets or the like 58. The knives 56 and associated plates are arranged at spaced intervals along the chains 37 for a purpose to be described.

Figure 1:
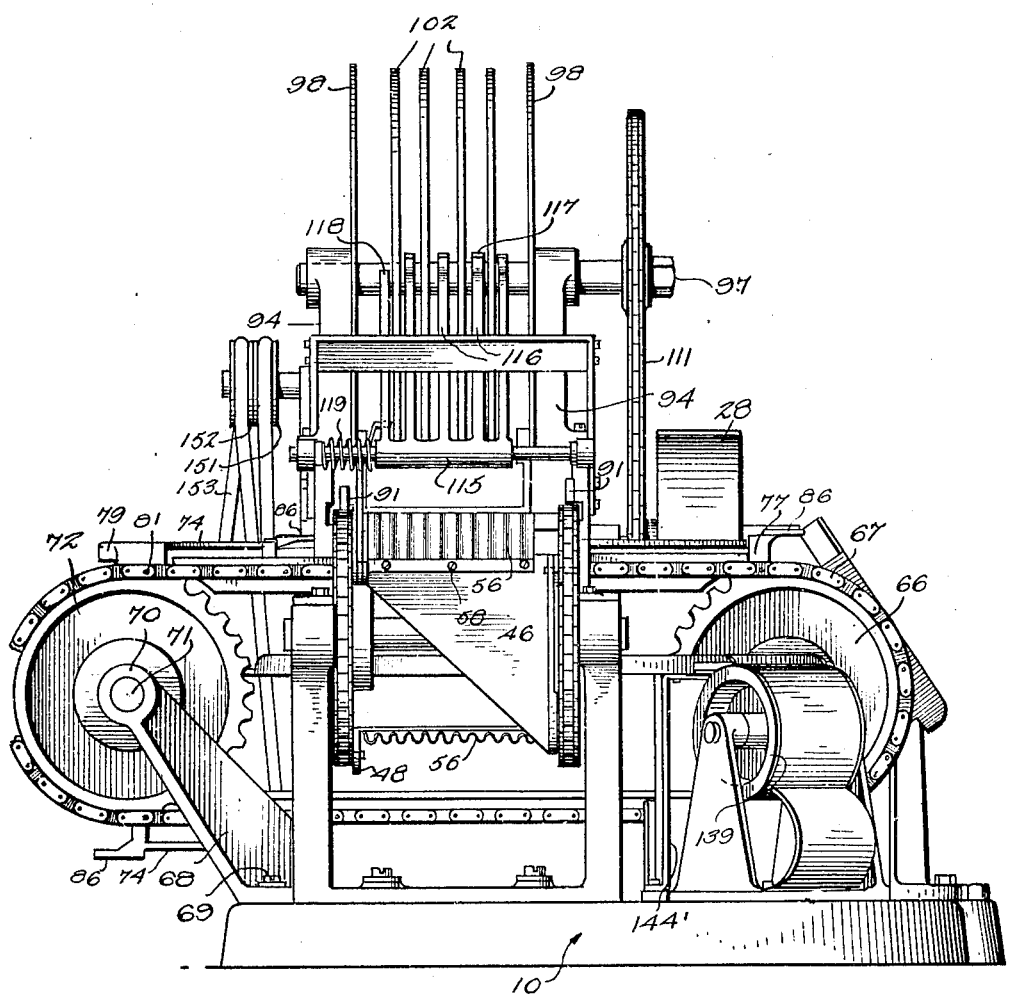
Figure 1 is a side elevation.
Figure 2:
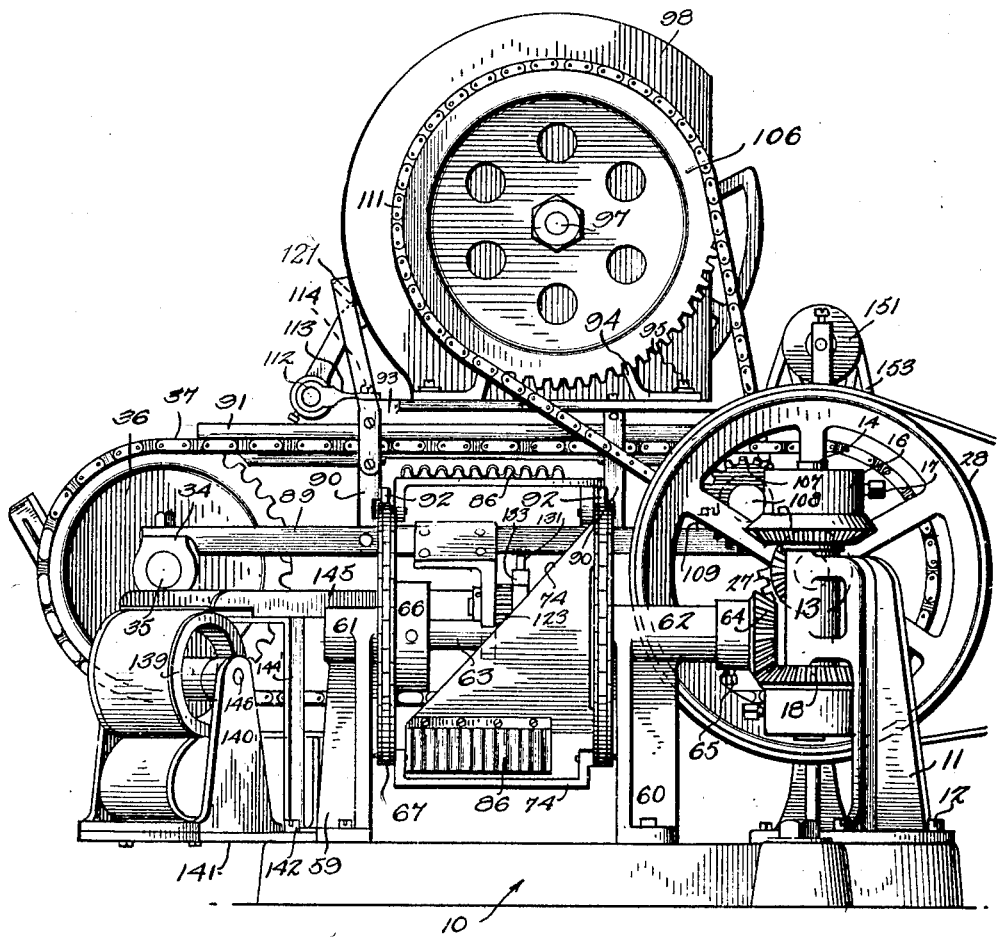
Figure 2 is a similar view looking in a direction at right angles to Figure 1.

As shown in Figure 2, a pair of standards 59 and 60 are arranged adjacent one of the other edges of the base 10. These standards are provided at their upper ends with bearings 61 and 62 and a shaft 63 is supported for rotation in these bearings. The shaft 63 is provided outwardly of the bearing 62 with a bevel gear 64 secured to the shaft by a set screw or the like 65. The bevel gear 64 is adapted to be driven by the bevel gear 18. A pair of sprockets 66 is secured to the shaft 63 inwardly of the bearings 61 and 62. These sprockets are similar in construction to the sprockets previously described and endless chains 67 pass thereabout, as shown. At the opposite side of the base 10, a pair of upwardly and outwardly extending supports 68 are arranged and these supports are secured to the base as at 69. Bearings 70 are formed integral with the upper ends of the supports 68 and rotatably support a shaft 71. Sprocket wheels 72 are secured to this shaft inwardly of the bearings and in alinement with the sprockets 66. As clearly shown in Figure 1, the chains 67 also pass about the sprockets 72. Obviously the upper and lower runs of the chains 67 cannot lie respectively in the same planes as the upper and lower runs of the chains 37. Therefore, these chains must be offset vertically and in the present case I have illustrated the centers of the shafts 63 and 71 as being arranged below the centers of the shafts 26 and 35. The chains 67 are also adapted to drive cutting knives and plates associated therewith similar to the corresponding elements previously described as being driven by the chains 37. The numeral 73 designates the cutting knife and associated elements carried by the chains 67.

As shown, a forward plate 74 is provided having a lug 75 at one edge and a similar lug 76 arranged at its opposite edge, and pins 77 pass through these lugs and are connected to the chains 67 to pivotally support the plates 74. The forward edge 78 of each plate 74 extends along a line arranged substantially at an angle of forty-five degrees to the lines of the chains 67. Adjacent its forward end, the plate 74 is also provided with a depending lug 79 provided with a slot 80 and a pin 81, carried by one of the chains 67, as adapted to extend into the slot 80. A second plate 82 is arranged rearwardly of the plate 74, as shown. The rear edge 83 of this plate is arranged substantially parallel to the forward edge 78 of the plate 74, and lies at an angle of substantially forty-five degrees with respect to the chains 67. At its shorter edge, the plate 82 is provided with a depending lug 84 in which is arranged a pin 85 secured to the adjacent run of the chain 67. At its opposite edge, in alinement with the lug 84, a similar lug is provided to permit the opposite edge to be pivotally connected with the chain in a similar manner. Adjacent the rear end of its inner edge, the plate 82 is also provided with a depending lug similar to the lug 79 and provided with a slot adapted to receive a pin (not shown) secured to the adjacent run of the chain. The connections between the lugs at the wider edge of the plate 82 with the chain are similar to the connections between the lugs 76 and 79, and the chain, and need not be described or shown in detail. The adjacent edges of the plates 74 and 82 are spaced as are the adjacent edges of the plates 39 and 46, and a corrugated knife 86 is arranged between these edges. The knife is provided with a flat rear flange 87 secured to the plate 82 by rivets or the like 88. As previously stated, the chains 37 and 67 are offset vertically, but it will be apparent that the arrangement of the plates 39 and 46 below their chains 37, and the arrangement of the plates 74 and 82 above their chains, serves to place the various plates and their corresponding knives on the same plane when they are driven from the upper runs of the chains.

As shown in Figures 2, 4 and 5, a pair of horizontal rails 89 are connected between the bearings 24 and 25, and the bearings 34. These rails are preferably formed of channel iron and are adapted to support four posts 90, as clearly shown in Figures 2 and 4. Bars 91 are secured between pairs of the posts 90 above and preferably in contact with the chains 37 to prevent upward movement of the chains during the cutting operation, as will become apparent. At right angles to the bars 91, another pair of bars 92 are connected to the posts 90 and the bars 92 are similarly arranged above and preferably in contact with the chains 67 for the same purpose. Supporting rails 93 are also connected to the upper ends of the posts 90 substantially parallel to the bars 91. These supporting rails are adapted to support bearing brackets 90 secured thereto as at 95, as shown in Figures 2 and 5. The upper ends of the members 94 are provided with alined bearings 96 rotatably supporting a shaft 97. A guard plate 98 surrounds the shaft 97 inwardly of each of the bearings 96 and these guard plates may be secured to the members 94 by rivets or the like 99. The shaft 97 is adapted to support a feed device indicated as a whole by the numeral 100. As shown, the feeding device comprises a hub portion 101 and blades 102, shown in detail in Figure 6 of the drawings. The plates comprise opposite segmental portions 103 connected to the hub 101 by transverse bars 104. It will be apparent that the blades 102 are arranged parallel to each other and the spaces between the segmental portions thereof define potato receiving spaces. One of the outer blades 102 is provided upon each of its segmental portions with an outstanding pin 105 for a purpose to be described. Means are provided for slowly rotating the shaft 97. As shown, a sprocket 106 is secured to the shaft outwardly of one of the bearings 96. A gear 107 is mounted upon a shaft 108 journalled in a bearing 109 supported upon one of the rails 89. Inwardly of the gear 107 a sprocket 110 is secured to the shaft 108 and a chain 111 passes about this sprocket and about the sprocket 106. Obviously the sprocket 106 is materially larger than the sprockets 110 and accordingly the shaft 97 and its associated elements will be rotated at a relatively slow speed.

Means are provided for positively feeding the potatoes downwardly into contact with the cutting members previously described. Referring to Figure 2 of the drawings the numeral 112 designates a shaft journalled in bearings 113 secured as at 114 to the rails 93. A hub 115 is secured to the shaft 112 and is provided with a plurality of fingers 116 having upturned ends 117. The hub 115 is also provided at one end with a finger 118 arranged in the path of travel of the pins 105 previously described. As shown in Figure 3 a spring 119 is adapted to normally swing the fingers upwardly to a substantially vertical position. A guide bar 120 is arranged transversely of the fingers 116, as shown in Figure 6, and this bar is provided at its ends with depending arms 121 secured to opposite posts 90 as shown in Figure 2. It will be apparent that when the spring 119 moves the fingers upwardly their movement will be limited by the bar 120.

As shown in Figure 5, means may be provided for positively preventing the potatoes from being displaced during the cutting operation. A bar 122 is arranged above the path of travel of each of the sets of blades or knives 56 and 86 and these bars 122 are rigidly secured to the plates 98.

It has been found that as the potatoes are cut, there is a tendency for the wet slices to cling to the lower surfaces of the knives and means are provided for displacing the successive slices. As shown in Figures 3, 6 and 8, a gear 123 is secured to the shaft 26 and meshes with a gear 124 carried by a shaft 125 mounted in an arm 126. This arm has a forked end 127 adapted to receive the shaft 26 as shown in Figure 6. The opposite end of the arm 126 is secured to a cross member 128, the opposite ends of which are secured to the rails 89. The shaft 125 is also provided with a cam 129 having a depression 130 in its edge. A lever 131 is pivotally connected to the arm 126 as at 132. This lever is provided at one end with a finger 133 adapted to drop into the depression 130 as the gear 124 is rotated. The construction of the lever 131 and associated elements is shown in detail in Figure 10 of the drawings. The opposite end of the lever 131 is provided with a head 134 to which is secured a plate 135 having a corrugated upper edge 136 corresponding to the corrugations of the cutting knives. A spring 137 is connected between the head 134 and the adjacent end of the arm 126 and normally urges the plate 135 upwardly. It will be apparent however, that contact of the finger 133 with the edge of the cam 129 maintains the plate 135 normally in the position indicated in Figures 6 and 8 of the drawings. It will be apparent that the plate 135 is associated with the knives 56 and cooperates therewith in a manner to be described. Another plate 135 is also associated with the knives 86 and is adapted to be operated in a similar manner by rotation of the shaft 63. The operating members are similar to the members previously referred to and need not be described in detail.

An endless belt 138 extends between the runs of the chains 37 and 67 diagonally with respect thereto. This belt passes about pulleys 139 supported in bearings 140, the bearings being mounted upon plates 141 secured to the base 10 as at 142. A guide trough 143 extends substantially throughout the distance between the pulleys 139 to support the belt against sagging. This trough is provided with a base portion 144 as shown in Figures 6 and 8, and is further provided with side flanges 145. The base portion of the trough terminates a short distance inwardly of the pulleys 139, while the flanges 145 extend substantially to points above the centers of the sprockets 139 to act as guides for taking off the sliced chips in a manner to be described. The trough 143 is adapted to be supported by brackets 144'.

The pulleys 139 are, of course, supported upon suitable shafts 146, and one of these shafts is provided with a pulley 147. As shown in Figure 5, the shaft 26 is provided outwardly of the bearing 25 with a pulley 148. A bracket 149 extends upwardly from the bearing 25 and supports a shaft 150 at its upper end. A pair of idler pulleys 151 and 152 are rotatable upon the shaft 150. A belt 153, preferably circular in cross section passes about the pulley 148. The belt runs over the pulley 151, thence downwardly about the pulley 147, upwardly around the pulley 152 and then downwardly around the pulley 148. It will be obvious therefore that rotation of the pulley 148, driven by the shaft 26 is adapted to rotate the pulleys 147 and 139, thus driving the endless belt 138.

The operation of the machine is as follows:

Power is transmitted to the large pulley 28 in any suitable manner to rotate the shaft 26. Rotation of the latter is adapted to drive the chains 37, as will be apparent. Power will be transmitted through the bevel gears 27 and 16, to the shaft 14, thus rotating the bevel gear 18, driving the bevel gear 64 and shaft 63. Rotation of the shaft 63 obviously will drive the chains 67. It will be apparent that rotation of the shaft 26 also will impart a rotating action to the blades 102 through the gears 29 and 107, the sprockets 110 and 106, and the chain 111. As previously stated, the rotation of the blades 102 will be relatively slow. The cutting elements of the chains 37 and 67 are adapted to be driven in the direction of the arrows indicated in Figure 4 of the drawings. In operation, potatoes are placed in the spaces between the segmental portions 103 of the blades 102, the latter rotating in the direction of the arrow indicated in Figure 6. It will be apparent that the upper space between the segments 103 will gradually turn downwardly in a counter-clockwise direction. This action moves the lower pin 105 along the finger 118 until it is released from the end thereof. The fingers 116 are arranged in the spaces between the blades 102, and when they are released by the pin 105, they are moved upwardly and outwardly until they contact with the bar 120. Thus the fingers 116 are removed from the path of travel of the potato being turned downwardly by the blades 102. After the potato is turned downwardly a sufficient distance, the other pin 105 will contact with the finger 118 and slowly turn the fingers 116 downwardly against the tension of the spring 119, as will be obvious. These fingers then contact with the potato, gradually feeding it downwardly until it has been entirely sliced whereupon the fingers again are released to repeat their operation. With the potato supported upon one of the plates 74, the associated knife 86 will slice from the bottom of the potato, leaving a corrugated surface on the lower end of the potato. After the knife has passed, the potato will be supported upon the adjacent plate 82, and as this plate moves from beneath the potato, one of the plates 39 will be brought into position. The adjacent edges of the plates 39 and 82 are arranged diagonally with respect to their chains, but are in proximity and parallel to each other. Thus the potato will be prevented from slipping downwardly between the plates 39 and 82. The next knife 56 then repeats the cutting operation at right angles to the preceding slicing operation, the corrugations being placed in the upper face of the slice at right angles to those previously formed, and since the knives 56 and 86 are arranged substantially in the same horizontal plane, it will be apparent that the corrugations will intersect each other, thus forming a slice having a perforated lattice work effect. After the knife 56, referred to, has completed its operation, the potato will be supported upon the plate 46 until the next adjacent plate 74 comes into position, the diagonal edges of the plates 46 and 74 bearing the same relationship to each other as the chains 37 and 67 travel, as that previously described in connection with the diagonal edges of the plates 39 and 82. Thus the chains may be driven to cut successive slices as long as desired, the potatoes being fed downwardly by the fingers 16 in the manner described. The slotted arrangement of the lugs carried by the plates associated with the cutting knives is provided to permit the plates to turn about the sprockets, as will be apparent in Figure 8 of the drawings. Rotation of the cams 129 is effected by the meshing of the gears 123 and 124, and the finger 133 is adapted to drop into the depression 130 just as the associated knife completes its cutting operation. The plate 135 is then moved upwardly by the spring 137, contacting with the edge of the completed slice forwardly of the blade, thus dislodging the slice from the plate as the latter travels along its path. The plate 135 is then lowered by the elevation of the finger 133. The successive slices thus formed drop upon the belt 138 and are carried thereby from beneath the cutting knives. The belt 138 may be driven in either direction and suitable receptacles may be provided for catching the slices. As the chips are carried from the machine by the plate 138, the flanges 145 are adapted to act as guides to prevent the slices from falling from the sides of the belt. The slices thus formed may be cooked in any desired manner, as will be apparent.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. Apparatus of the character described comprising a pair of angularly arranged endless drive mechanisms, spaced cutting means carried by each of said mechanisms, the paths of said cutting means intersecting substantially at a common point, the cutting means of each of said mechanisms being adapted to pass said intersecting point alternately, means for driving said mechanisms, and means for feeding articles to be cut to said intersecting point in the path of travel of said cutting means.

2. Apparatus constructed in accordance with claim 1 provided with means for supporting the articles to be cut between the periods when said cutting means pass said intersecting point.

3. Apparatus constructed in accordance with claim 1 provided with supporting members carried by said drive mechanisms adjacent each of said cutting means and arranged substantially in the same plane therewith when said cutting means are at and adjacent said intersecting point.

4. Apparatus constructed in accordance with claim 1 provided with supporting plates arranged forwardly and rearwardly of each of said cutting means in proximity thereto and substantially in the same plane therewith when the cutting means are at and adjacent said intersecting point.

5. Apparatus of the character described comprising a pair of parallel endless chains, a second pair of parallel endless chains arranged substantially at right angles to said first pair and offset vertically with respect thereto, a plurality of spaced knives carried by each of said pairs of chains, the paths of the knives of both pairs of chains being adapted to intersect substantially at a common point, means for feeding articles to be cut to said intersecting point, supporting plates arranged forwardly and rearwardly of each of said knives and carried by said chains, the forward edge of each of said forward plates and the rear edge of the associated rearward plate being parallel and arranged diagonally with respect to the chains by which they are carried, the knives of said pairs of chains being adapted to alternately pass said intersecting point whereby the diagonal edge of each of the rearward plates carried by one pair of chains will pass the diagonal edge of one of the forward plates carried by the other pair of chains in proximity thereto, said plates at and adjacent their passing points lying substantially in the same plane, and means for driving said pairs of chains.

6. Apparatus constructed in accordance with claim 5 provided with means for exerting a constant force on the articles to be cut tending to urge them into the path of travel of said knives.

7. Apparatus constructed in accordance with claim 5 provided with means for separating successive slices of the article being cut from each of said knives as the latter complete their cutting operation.

8. Apparatus constructed in accordance with claim 5 provided with a member adapted to be raised in proximity to the knives of each pair of chains to remove slices of the article being cut therefrom.

9. Apparatus constructed in accordance with claim 5 provided with a member adapted to be raised in proximity to the knives of each pair of chains to remove slices of the article being cut therefrom, and means for momentarily lifting said last named members as each slicing operation is completed.

10. Apparatus constructed in accordance with claim 5 provided with a lever associated with each pair of chains, a member carried by one end of each of said levers and adapted to be raised momentarily in proximity to said knives as each cutting operation is completed to remove slices of the article therefrom, and a cam associated with the opposite end of each of said levers for raising said members.

11. Apparatus constructed in accordance with claim 5 provided with a conveyor arranged diagonally with respect to said pairs of chains, a portion of said conveyor passing beneath the common intersecting point of the paths of said knives and adapted to receive the slices cut from the articles.

12. Apparatus constructed in accordance with claim 5 provided with an endless belt conveyor arranged diagonally with respect to said pairs of chains, a portion of said belt passing beneath the common intersecting point of the paths of said knives and adapted to receive the slices cut from the articles, pulleys about which said belt passes, and means for driving one of said pulleys.

13. Apparatus constructed in accordance with claim 5 wherein the means for feeding the articles to be cut comprises an article receiving member rotatable about a horizontal axis above the common point of intersection of the paths of said knives and provided with pockets to receive the articles, means for slowly rotating said article receiving member to successively turn the pockets thereof downwardly to place the articles in said pockets in the path of said knives, and spring pressed means for exerting a downward pressure on each article to be cut when it is in the path of said knives.

14. Apparatus constructed in accordance with claim 5 wherein the means for feeding the articles to be cut comprises a horizontal shaft arranged above the common point of intersection of the paths of said knives, a plurality of blades fixed to said shaft, said blades being provided with alined cut-out portions at opposite sides thereof to provide article receiving pockets, means for slowly rotating said shaft to successively turn said pockets downwardly to place the articles therein in the paths of said knives, a plurality of parallel fingers extending between said blades, said fingers being pivoted outwardly of said blades to swing vertically, a spring normally urging the free ends of said fingers upwardly out of the path of travel of the articles in said pockets, and means carried by one of said plates and adapted to engage one of said fingers for moving said fingers downwardly into contact with the articles.

15. Apparatus of the character described comprising a base, a pair of shafts arranged above opposite sides of said base, a pair of sprockets carried by each of said shafts, a pair of parallel chains passing about said sprockets, a second pair of shafts arranged above opposite sides of said base at right angles to the other pair of shafts, a pair of sprockets carried by each of said last named shafts, a pair of parallel chains passing about said last named pairs of sprockets and offset vertically with respect to the other pair of chains, a plurality of spaced knives carried by each of said pairs of chains, the paths of the knives of both pairs of chains being adapted to intersect substantially at a common point, means for feeding articles to be cut to said intersecting point in the path of travel of said knives, supporting plates arranged forwardly and rearwardly of each of said knives and carried by said chains, the forward edge of each of said forward plates and the rear edge of the associated rearward plate being parallel and arranged diagonally with respect to the chains by which they are carried, the knives of said pairs of chains being adapted to alternately pass said intersecting point whereby the diagonal edge of each of the rearward plates carried by one pair of chains will pass the diagonal edge of one of the forward plates carried by the other pair of chains in proximity thereto, said plates at and adjacent their passing point lying substantially in the same plane, and common means for driving one shaft of each pair.

16. Apparatus constructed in accordance with claim 15 wherein each of said knives is corrugated, the corrugations of said knives lying parallel to the paths of chains by which they are carried whereby the corrugations cut in one side of each slice will lie at right angles to and intersect the corrugations formed in the opposite side of each slice.

17. Apparatus constructed in accordance with claim 15 provided with a pair of rotatable shafts arranged above diagonally opposite corners of said base, pulleys carried by said shafts, an endless conveyor belt passing around said pulleys, said belt being arranged diagonally with respect to said pairs of chains, the upper run of said belt lying beneath the upper runs of said pairs of chains and passing beneath the common intersecting point of the paths of said knives, and means connected with said common driving means for driving said conveyor belt.

18. Apparatus of the character described comprising a pair of angularly arranged endless carriers, and a plurality of spaced cutting means carried by each of said carriers, the paths of said cutting means intersecting substantially at a common point, the cutting means of each of said carriers being adapted to pass said intersecting point alternately.

19. Apparatus of the character described, comprising a pair of angularly arranged endless carriers, a plurality of spaced carriers carried by each of said cutting means, the paths of said cutting means intersecting substantially at a common point, the cutting means of each of said carriers being adapted to pass said intersecting point alternately, and means for driving said mechanisms.

In testimony whereof I affix my signature.

JULIUS H. KINTZELE.